(12) United States Patent
Zimmerman et al.

(10) Patent No.: US 11,192,792 B2
(45) Date of Patent: Dec. 7, 2021

(54) BORONIZING POWDER COMPOSITIONS FOR IMPROVED BORIDE LAYER QUALITY IN OIL COUNTRY TUBULAR GOODS AND OTHER METAL ARTICLES

(71) Applicant: BWT LLC, Greenville, SC (US)

(72) Inventors: Craig Zimmerman, Oak Creek, WI (US); Nick Bugliarello-Wondrich, St. Charles, IL (US); Jeff Hemmer, Indianapolis, IN (US)

(73) Assignee: BWT LLC, Greenville, SC (US)

( * ) Notice: Subject to any disclaimer, the term of this patent is extended or adjusted under 35 U.S.C. 154(b) by 809 days.

(21) Appl. No.: 15/918,045

(22) Filed: Mar. 12, 2018

(65) Prior Publication Data

US 2018/0265364 A1    Sep. 20, 2018

Related U.S. Application Data (60) Provisional application No. 62/471,152, filed on Mar. 14, 2017.

(51) Int. Cl.
*C01B 32/991* (2017.01)
*C01B 32/956* (2017.01)
(Continued)

(52) U.S. Cl.
CPC .......... *C01B 32/991* (2017.08); *C01B 32/956* (2017.08); *C01B 35/02* (2013.01);
(Continued)

(58) Field of Classification Search
CPC ..... C01B 32/956; C01B 32/991; C01B 32/20; C01B 35/02; C23C 8/68; C23C 8/00;
(Continued)

(56) References Cited

U.S. PATENT DOCUMENTS 3,806,374 A    4/1974   Krzyminski
3,809,583 A    5/1974   Krzyminski
(Continued)

FOREIGN PATENT DOCUMENTS

CN    1275637 A    12/2000
CN    102154616 A    8/2011
(Continued)

OTHER PUBLICATIONS

Examination Report issued in Canadian Patent Application No. 2998048, dated May 28, 2020, 5 pages.
(Continued)

*Primary Examiner* — Jie Yang
(74) *Attorney, Agent, or Firm* — Dilworth IP, LLC (57) ABSTRACT

A powder boronizing composition comprising:
a. 0.5 to 4.5 wt % of a boron source selected from $B_4C$, amorphous boron, calcium hexaboride, borax or mixtures thereof;
b. 45.5 to 88.5 wt % of a diluent selected from SiC, alumina or mixtures thereof;
c. 1.0 to 20.0 wt % of an activator selected from $KBF_4$, ammonia chloride, cryolite or mixtures thereof; and
d. 10.0 to 30.0 wt % of a sintering reduction agent selected from carbon black, graphite or mixtures thereof.

13 Claims, 6 Drawing Sheets

(51) Int. Cl.
    *C01B 35/02*           (2006.01)
    *C01B 35/06*           (2006.01)
    *F16L 58/04*           (2006.01)
    *C01F 7/02*            (2006.01)
    *C23C 8/70*            (2006.01)
    *F16L 9/02*            (2006.01)
    *C01B 35/12*           (2006.01)
    *C23C 8/68*            (2006.01)
    *C23C 8/60*            (2006.01)

(52) U.S. Cl.
    CPC .......... *C01B 35/066* (2013.01); *C01B 35/122* (2013.01); *C01F 7/02* (2013.01); *C23C 8/60* (2013.01); *C23C 8/68* (2013.01); *C23C 8/70* (2013.01); *F16L 9/02* (2013.01); *F16L 58/04* (2013.01)

(58) Field of Classification Search
    CPC ..... C23C 8/60; F16L 58/04; F16L 9/02; B01J 20/043; B01J 20/08
    USPC ....................................................... 423/449
    See application file for complete search history.

(56) References Cited

U.S. PATENT DOCUMENTS

| | | | |
|---|---|---|---|
| 3,936,327 | A | 2/1976 | Fichti et al. |
| 4,126,488 | A | 11/1978 | Kunst et al. |
| 4,172,162 | A | 10/1979 | Danzey |
| 4,217,141 | A | 8/1980 | Schrittwieser |
| 4,289,545 | A | 9/1981 | Thevenot et al. |
| 4,348,980 | A | 9/1982 | Thevenot et al. |
| 4,404,045 | A | 9/1983 | Thevenot et al. |
| 4,637,837 | A | 1/1987 | von Matuschka et al. |
| 5,455,068 | A | 10/1995 | Aves et al. |
| 6,245,162 | B1 | 6/2001 | Baudis et al. |
| 6,478,887 | B1 | 11/2002 | Sue et al. |
| 6,503,344 | B2 | 1/2003 | Baudis et al. |
| 7,264,682 | B2 | 9/2007 | Chandran et al. |
| 8,012,274 | B2 | 9/2011 | Skaff |
| 8,187,393 | B2 | 5/2012 | Zlatev et al. |
| 8,316,679 | B2 | 11/2012 | Fiorucci et al. |
| 8,894,770 | B2 | 11/2014 | Carlisle |
| 8,974,857 | B2 | 3/2015 | Yoon et al. |
| 2006/0074491 | A1* | 4/2006 | Smith ................... A61L 27/04 623/20.28 |
| 2009/0293993 | A1 | 12/2009 | Zlatev et al. |
| 2010/0018611 | A1 | 1/2010 | Timur et al. |
| 2013/0243955 | A1 | 9/2013 | Carlisle |
| 2014/0096858 | A1 | 4/2014 | Nam et al. |
| 2015/0225834 | A1 | 8/2015 | Pham et al. |
| 2016/0108512 | A1 | 4/2016 | Medvedovski |
| 2016/0298211 | A1 | 10/2016 | Bergeron et al. |

FOREIGN PATENT DOCUMENTS

| | | |
|---|---|---|
| CN | 104032311 A | 9/2014 |
| EP | 1026282 B1 | 3/2003 |
| GB | 950767 A | 2/1964 |
| GN | 101487110 A | 7/2009 |
| IN | 1369/DEL/1999 | 3/2007 |
| JP | 2000119839 A | 4/2000 |
| WO | 2008/100155 A1 | 8/2008 |

OTHER PUBLICATIONS

Zimmerman, Adv. Mater. & Proc., Sep. 2016, 2 pages.
Zimmerman, ASM Handbook, vol. 4A, Steel Heat Treating Fundamentals and Processes, 2013, 16 pages.
Akkurt et al., "The Radiation Shielding Properties of Boronized Vanadium Steels", 3 pages, downloaded on Jan. 9, 2014.
Alimov, Pharm. Chem. Journal, May 1975, vol. 9(5) 324-336.
Alberta Innovates—Technology Futures, Laboratory Test Report, Nov. 30, 2012, 4 pages.
Carbucicchio et al., Hyperfine Interactions, 69 (1991) 843-846.
Dearnley, Surface Engineering, 1985, vol. 1, No. 3, 15 pages.
Hernandez et al., Adv. in Mater. Science and Eng., vol. 2014, Article ID 249174, 9 pages.
HTS ASM International, Nov.-Dec. 2014, vol. 2, Issue 4, 16 pages.
Lin et al., Int. J. Electrochem. Sci., 10 (2015) 2694-2706.
Medvedovski et al., Adv. Eng. Mater., 2014, 16, No. 6, 713-728.
Medvedovski et al., Adv. Eng. Mater., 2016, 18, No. 1, 11-33.
Medvedovski et al., Ceramics International 42 (2016) 3190-3211.
Osborne et al., Oak Ridge Nat'l Library, UT-Battelle, LLC, US Dept. of Energy, Aug. 2000, 33 pages.
EndurAlloy Tubing, Endurance Technologies Inc., 2012 Sucker Rod Pumping Workshop, 4 pages.
Garza et al., West Texas Case Study 2009, 7 pages.
"A Strong Investment EndurAlloy™ Production Tubing", promotional material downloaded from www.endurancetechnologies.com on Mar. 21, 2016.
"EndurAlloy Tubing", promotional material downloaded from www.endurancetechnologies.com on Mar. 21, 2016.
U.S. Appl. No. 15/918,198, filed Mar. 12, 2018.
U.S. Appl. No. 15/918,560, filed Mar. 12, 2018.
PCT International Search Report and Written Opinion dated Jun. 7, 2018 from Application No. PCT/US2018/021923, 14 pages.
PCT International Search Report and Written Opinion dated Jun. 1, 2018 from Application No. PCT/US2018/021925, 5 pages.
PCT Invitation to Pay Additional Fees and Partial Search Results dated Jun. 11, 2018 from Application No. PCT/US2018/021971, 20 pages.

* cited by examiner

BORONIZING POWDER COMPOSITIONS FOR IMPROVED BORIDE LAYER QUALITY IN OIL COUNTRY TUBULAR GOODS AND OTHER METAL ARTICLES

FIELD OF THE INVENTION

The invention relates to boriding powder compositions for case hardening metal articles. More particularly, the invention relates to boronizing powder compositions for boriding of metal tubes and pipes that provide excellent boride layer characteristics as well as improved processing.

BACKGROUND OF THE INVENTION

Treating metal surfaces is sometimes necessary when the targeted application for the metal workpiece subjects the metal to high wear, erosion or corrosion. For example, metal parts in agricultural equipment are sometimes treated to withstand the erosive demands required during their normal use. Even more demanding applications involve both erosion and corrosion. Such an application is embodied in the oil and gas industry where deep wells are involved. In oil/gas drilling, a sucker rod pump can be used to pump desired products to the surface for recovery. The pump functions from the surface by oscillating a sucker rod up and down inside a pipe that drives a pump located at the bottom of the well. Each upward stroke of the pump transports liquid containing the targeted product up through a tube towards the surface. But such environments can be very harsh, with temperatures of 250° C. and pressures of 70 MPa or higher, not being uncommon. The presence of sour crude in the well also means corrosive compounds such as hydrogen sulfide, carbon dioxide, methane, produced water, produced crude and acidic conditions will be present. Under the best of circumstances, these conditions alone would represent a challenge to a pipe operating in such a service, however, the action of the sucker-rod pump complicates it still further, since the rod can wear against the inside surface of the pipe as it moves up and down. This mechanism of wear removes a portion of the metal tubing's surface layer, exposing the underlying layer to corrosion. This wear is even further accelerated by the presence of abrasive sand particles also being present in the crude oil being pumped. However, the newly corroded layer cannot protect the pipe from further corrosion since it is swiftly worn away by the continued action of the pump rod. Thus, an undesirable, repetitive cycle of erosion/corrosion/erosion takes place that can rapidly cause the pipe to fail. Since environmental concerns in recent years have pushed drilling rigs into deep water, further away from coastlines, the implications of pipe failure are very serious. Thus, drillers have preferred treated pipe for drilling and pumping applications, particularly, the diffusion-based treatments such as nitriding, carburizing and boriding. However, while nitriding and carburizing can produce hard metal surfaces, nitrided and carburized cases are not nearly as hard and wear resistant as a boronized case, which creates a wear layer with higher hardness than many wear resistant thermal spray coatings, such as tungsten carbide and chrome carbide. In the boriding process, the boron is not mechanically bonded to the surface such as is the case with many coating processes, but instead is diffused below the surface of the metal, making it less prone to delamination, peeling and breaking off treated parts. Just as importantly, these other methods cannot provide the corrosion resistance that boronizing offers.

Several methods for boronizing metal articles are available. For example, liquid boriding techniques can be employed, where electrolytic or electroless baths are employed to deposit layers of borides. Gas boriding or plasma boriding can also be used. However, these methods, while having certain advantages, are unsuitable for environmental reasons or are impractical for long tubing. Paste-boriding is a particular type of selective boriding, where the boronizing composition is applied as a paste to the metal surface, and then heated. This technique, while being useful for localized spot boriding, is completely unsuitable for pipes because there is no practical way of applying the paste through the length of the pipe. Powder pack boronizing, typically referred to as "pack cementation" boronizing, involves placing a metal part in physical contact with the boron source as part of the boronizing powder composition. For example, a metal part can be buried in a quantity of powder, or a pipe can be filled with powder so it contacts the pipe's interior surface while the pipe is heated.

Powder boronizing compositions typically contain a boron source, an activator, and often a diluent, where reactive boron-containing compounds such as amorphous boron, crystalline ferroboron, boron carbide ($B_{4}C$), calcium hexaboride ($CaB_6$), or borax react with a halide-based activator upon heating to form gaseous boron trihalides, such as $BF_3$ or $BCl_3$, which react with the metal surface to deposit boron on the surface. The boron is then able to diffuse into the metal structure. Various diluents are included to provide bulk and reduce cost.

Commercially available boriding agents typically produce dual-phase FeB+$Fe_2$B boride layers if a specific boride layer depth is exceeded, which can vary by alloy composition of the workpiece being treated. Typically, plain carbon steels, such as AISI 1018, will begin to exhibit dual phase boride layers if a total boride layer depth of 0.005" inch is exceeded. A low alloy steel material, such as AISI 4140 steel, will exhibit dual phase boride layers if a total boride layer depth of 0.003" is exceeded. Many tool steels, such as A2, D2, S7, and H13 will exhibit dual phase boride layers if total boride layer thickness of 0.002" is exceeded. The highest alloy content ferrous materials are stainless steels where dual phase boride layers may not be avoided at any depth with these powder compositions. The commercially available boriding powders that are most popularly used in industry oftentimes will restrict the users to only reaching shallow boride layer depths on most materials if they want to produce a single-phase boride layer. Borided oil country tubular goods (OCTG) available on the market are typically borided to form a 0.005" to 0.015" inch deep boride layer and it is normal for these boride layers to be dual phase boride layers with approximately 50% FeB and 50% $Fe_2$B present. Dual phase boride layers are known to be prone to problems with boride layer fracture, chipping, spalling and flaking off as cracks may form between the FeB and $Fe_2$B layers present.

Work has been ongoing to develop improved powder compositions, e.g., *Boriding (Boronizing) of Metals*, Craig Zimmerman, ASM Handbook, Volume 4A, *Steel Heat Treating Fundamentals and Processes* (2013), describes various techniques for boronizing. U.S. Pat. No. 5,455,068 discloses methods for treating continuous extended lengths of tubular member interiors. U.S. Pat. No. 8,894,770 discloses processes and apparatus to treat metal surfaces, and International Publication No. WO 2008/100155 discloses boron containing pastes. Nevertheless, further improvement is still needed to enhance efficiency in the boronizing process, and to further improve the quality and performance of the boron layer.

An improvement to the boride layer quality and performance is expected if the boride layers could be the same depth with a single-phase boride layer of near 100% $Fe_2B$. New boriding processes with new boriding powder compositions have been developed to allow for deep case boriding with a single phase $Fe_2B$ boride layer. It has unexpectedly been found that particular boronizing powder compositions can be designed that not only provide borided layers of excellent quality, but aid in the overall boriding process.

SUMMARY OF THE INVENTION

A new group of boriding powder compositions capable of performing deep case boriding has been developed. These new boriding powders have reduced boriding potential such that the boron flux into the surface is slowed to maintain a lower surface boron concentration during boriding. This is instrumental in being able to boride to deeper boride layer depths without forming the more boron-rich FeB iron boride compound at the surface of the components being treated. Boride layer depths of 0.010" to 0.020" have been produced with single phase $Fe_2B$ boride layers in plain carbon and low alloy steels such as AISI 1018 and AISI 4140. Boride layer depths ranging from 0.005" to 0.010" have been produced on tool steel alloys such as A2, D2, S7, and H13, with single phase $Fe_2B$ boride layers.

In one embodiment, the subject matter of the present disclosure relates to a powder boronizing composition comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof.

In another embodiment, the subject matter of the present disclosure relates to a process for boronizing a metal article comprising contacting a surface of the metal article with a powder comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof, in a powder container at a temperature from 1400° F. to 1900° F., thereby forming a boride layer comprising 80.0 to 100.0 vol % $Fe_2B$ and 0 to 20.0 vol % FeB.

In still another embodiment, the subject matter of the present disclosure relates to a process for boronizing a metal pipe comprising contacting an interior surface of the pipe with a powder composition comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof, at a temperature of 1400° F. to 1900° F., thereby forming a boride layer comprising 80.0 to 100.0 vol % $Fe_2B$ and 0 to 20.0 vol % FeB.

In still another embodiment, the subject matter of the present disclosure relates to a borided metal pipe produced from a process comprising contacting an interior surface of the pipe with a powder composition comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof, at a temperature of 1400° F. to 1900° F., thereby forming a boride layer comprising 80.0 to 100.0 vol % $Fe_2B$ and 0 to 20.0 vol % FeB.

Figure 1:
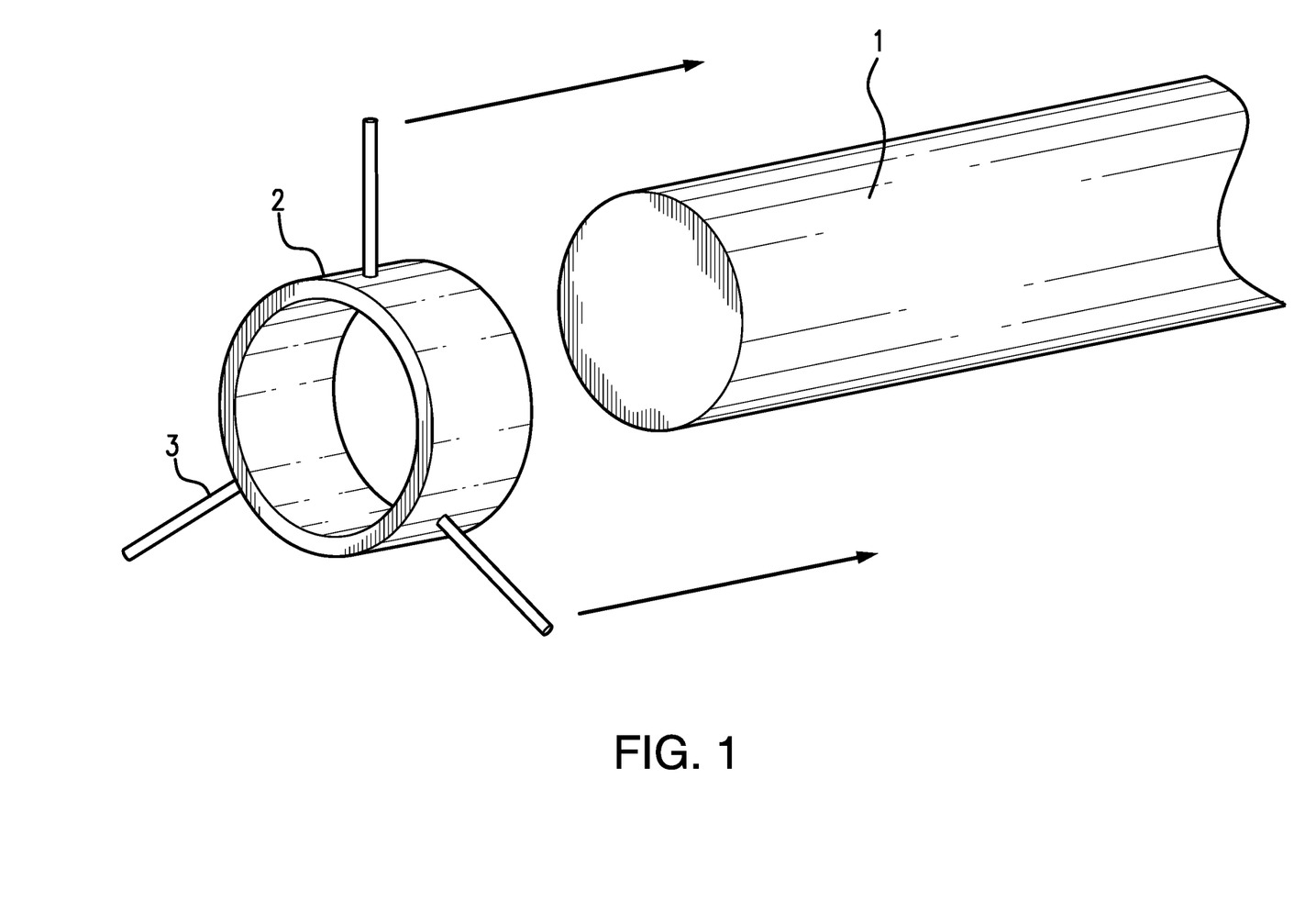
FIG. 1 illustrates a rod-shaped powder displacement insert with spacer ring.

In another embodiment, the subject matter of the present disclosure relates to a process comprising placing a boronizing powder composition inside a metal pipe comprising a first end, a second end, an inside surface and an outside surface; and heating the pipe to a temperature from 1400° F. to 1900° F., thereby forming a borided layer on the inside surface, and generating spent reaction gases and spent boriding powder, wherein a powder displacement insert is positioned centrally inside the metal pipe so that the powder boronizing composition is located in an annular space between the outside surface of the powder displacement insert and the interior surface of the metal pipe. Such a powder displacement insert is shown in FIG. 1.

In still another embodiment, the subject matter of the present disclosure relates to a process comprising drilling for or pumping oil and gas with a metal pipe produced by a process comprising placing a boronizing powder composition comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof, in a metal pipe comprising a first end, a second end, an inside surface and an outside surface; and heating the pipe to a temperature from 1400° F. to 1900° F., thereby forming a borided layer on the inside surface, and generating spent reaction gases and spent boriding powder mixtures thereof.

In still another embodiment, the subject matter of the present disclosure relates to a boronizing powder composition comprising: 0.5 to 3.0 wt % of a boron source selected from $B_4C$, amorphous boron, calcium hexaboride, borax or mixtures thereof; 1.0 to 15.0 wt % of an activator selected from $KBF_4$, ammonia chloride, cryolite, sodium fluoride, ammonium bifluoride, potassium fluoride, calcium fluoride, or mixtures thereof; and 82.0 to 98.5 wt % of a stream selected from sintering reduction agents, diluents or mixtures thereof, the sintering reduction agents being selected from carbon black, graphite, activated carbon, charcoal or mixtures thereof, and the diluents being selected from SiC, alumina, zirconia or mixtures thereof.

BRIEF DESCRIPTION OF THE DRAWINGS

The subject matter of the present disclosure will be more fully understood from the following detailed description, taken in connection with the accompanying drawings, in which:

FIG. 3b illustrates a section view of the retort in FIG. 3a.
FIG. 5b illustrates a section view of the retort in FIG. 5a.
FIG. 6b illustrates a section view of the retort in FIG. 6a.

DETAILED DESCRIPTION OF THE INVENTION

The subject matter of the present disclosure provides a boronizing powder composition, a process for boronizing a metal article using the powder and a boronized metal article produced using the process. The boronizing powder composition provides a boride layer with excellent quality, as well as excellent processing characteristics.

A new group of boriding powder compositions capable of performing deep case boriding has been developed. These new boriding powders have reduced boriding potential such that the boron flux into the surface is slowed to maintain a lower surface boron concentration during boriding. This is instrumental in being able to boride to deeper boride layer depths without forming the more boron-rich FeB iron boride compound at the surface of the components being treated. Boride layer depths of 0.010" to 0.020" have been produced with single phase $Fe_2B$ boride layers in plain carbon and low alloy steels such as AISI 1018 and AISI 4140. Boride layer depths ranging from 0.005" to 0.010" have been produced on tool steel alloys such as A2, D2, S7, and H13, with single phase $Fe_2B$ boride layers.

In one embodiment, the subject matter of the present disclosure relates to a powder boronizing composition comprising 0.5 to 4.5 wt % of a boron source selected from $B_4C$, amorphous boron, calcium hexaboride, borax or mixtures thereof; 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; and 10.0 to 30.0 wt % of a sintering reduction agent selected from carbon black, graphite, activated carbon, charcoal or mixtures thereof.

For the purpose of this specification, the terms "boronizing" and "boriding;" and "boronized" and "borided" will be used interchangeably to designate the boronizing process and pipes resulting from the process of the present subject matter. Also, the terms "pipe" and "tubing" will be used interchangeably to designate a cylindrical or round-shaped conduit for carrying fluids such as gases, liquids, slurries or powdered solids. When reference is made to the diameter of a tube or pipe, unless it is designated differently, it will mean the inside diameter of the tube or pipe. Finally, the term "powder" means a dry, bulk solid composed of a large number of very fine particles.

Boron Source

The boron source for use in the powder boronizing composition can generally be any reactive boron solid capable of reacting with a halide activator or fluorine or chlorine gas present in spent boronizing reaction gases to form gaseous boron trihalides, such as $BF_3$ or $BCl_3$. These gaseous compounds react with the surface of the metal to deposit boron on the surface of the workpiece which may then diffuse into the metallic structure and form an iron-boride compound layer. Preferably, the boron source is selected from $B_4C$, amorphous boron, calcium hexaboride, borax or mixtures thereof. More preferably, the boron source is $B_4C$. Preferably, the boron source is present in the powder boronizing composition in an amount of 0.5 to 4.5 wt %, based on the total weight of the powder boronizing composition. More preferably, the boron source is $B_4C$ and it is present in the powder boronizing composition in an amount of 2.0 to 4.0 wt %. Most preferably, the boron source is $B_4C$ and is present in the powder boronizing composition in an amount of 2.0 to 3.0 wt %. Levels of the boron source less than those recited can result in a poorer quality boride layer due to thinner boride layers and larger gaps and spacing between the teeth in the boride layer that would be occupied by lower hardness substrate material. The boride layer may also be inferior because the surface structure can be composed of both ferrite plus single phase $Fe_2B$. Levels of the boron source greater than those recited can result in poorer boride layer quality due to formation of a dual-phase boride layer comprised of both FeB and $Fe_2B$ which has inferior performance characteristics when compared to a single-phase boride layer comprised of only $Fe_2B$ iron boride.

Activator

The activator for use in the powder boronizing composition can generally be any halide-containing compound that is capable of dissociating upon heating to form gaseous boron trihalides, such as $BF_3$ or $BCl_3$. The boron trihalide molecules react with metal surfaces to deposit boron atoms on the surface which then diffuse inwards and form metal-boride compound layers below the metal surface. The resultant halide gases then may react with the boron source materials to form additional boron trihalide gases capable of delivering additional boron to the metal surface. Preferably, the activator is selected from $KBF_4$, ammonia chloride, cryolite, sodium fluoride, ammonium bifluoride, potassium fluoride, calcium fluoride, or mixtures thereof. More preferably, the activator is $KBF_4$. Preferably, the activator is present in the powder boronizing composition in an amount of 1.0 to 20.0 wt %, based on the total weight of the powder boronizing composition. More preferably, the activator is present in the powder boronizing composition in an amount of 3.5 to 10.0 wt %. Most preferably, the activator is $KBF_4$ and is present in the powder boronizing composition in an amount of 4.0 to 6.0 wt %. Levels of activator less than those recited can result in sintering of the boronizing powder, a highly porous boride layer, or a poorer quality boride layer due to incomplete layers or the formation of voids and porosity in the boride layer. Levels of activator greater than those recited can also result in sintering of the boronizing powder, as well as excessive unnecessary quantities of spent reaction gas, which can present environmental challenges.

Sintering Reduction Agent

The sintering reduction agent facilitates the operation and ease of performing the boronizing process by preventing sintering of the powder composition. This is an important consideration in process optimization, particularly in those situations where long, small diameter tubes must be boronized, because sintered materials cling to themselves and to the surfaces of the metal part. It can be a time-consuming process to remove the sintered material, especially in the case when the interior of long pipes is being boronized. Even in the case of simple geometry parts being boronized, it can be very challenging to remove parts from a sintered block of boronizing powder after the process is complete, which forms if the boronizing powder does not contain a sintering reduction agent. Very small parts can also be lost in the sintered boronizing powder which is not readily ground or crushed back down to loose powder that can be sifted and sieved to retrieve small parts. Without wishing to be bound by theory, it is believed that the sintering reduction agent functions by scavenging oxygen from the atmosphere of the boronizing process. Preferably, the sintering reduction agent is selected from carbon black, graphite, activated carbon, charcoal, or mixtures thereof. More preferably, the sintering reduction agent is carbon black. Preferably, the sintering reduction agent is present in the powder boronizing composition in an amount of 10.0 to 30.0 wt %, based on the total weight of the powder boronizing composition. More preferably, the sintering reduction agent is present in the powder boronizing composition in an amount of 12.0 to 25.0 wt %. Most preferably, the sintering reduction agent is present in the powder boronizing composition in an amount of 18.0 to 22.0 wt %. Levels of sintering reduction agent less than those recited can result in the boriding powder pack becoming sintered into a solid block of caked powder that is extremely difficult to break apart and remove parts from after processing. Levels of sintering reduction agent greater than those recited can result in shallower boride layers and the boriding powder having greatly reduced thermal conductivity, making it take longer to heat and cool the boriding powder packs. With lower thermal conductivity, it is more difficult to uniformly boride parts in larger size powder packs as the center portion of large packs are much slower to heat and cool than the outside edges of the same pack. The density of carbon black is also lower than the bulk powder, and it has been observed that the iron-boride compound layers are not as compact and dense below the surface when excessive amounts of carbon black are used instead of filling with more dense diluent materials such as SiC powder. This is mainly due to a specific mass of carbon black occupying more volume than the same mass of SiC powder, thus making the same weight percentages of boron source and activator become more dilutely spread out across a larger volume of powder.

Diluent

The diluent is included in the boronizing powder composition to provide bulk to the composition. The diluent must have good heat conductivity, must not sinter together during the process, and have high density making it more difficult for outside atmosphere gases to permeate into the pack and also making it more difficult for the boriding vapors ($BF_3$, $BCl_3$) to quickly exit the pack, and preferably, should be inert to the activator, boron source and sintering reduction agent. Preferably, the diluent is selected from SiC, alumina, zirconia or mixtures thereof. More preferably, the diluent is SiC. Preferably, the diluent is present in the powder boronizing composition in an amount of 45.5 to 88.5 wt %, based on the total weight of the powder boronizing composition. More preferably, the diluent is present in the powder boronizing composition in an amount of 61.0 to 82.5 wt %. Most preferably, the diluent is present in the powder boronizing composition in an amount of 69.0 to 76.0 wt %. Levels of diluent less than those recited can result in the inclusion of active components at higher levels than are desirable from an economic standpoint. Levels of diluent less than those recited could also lead to dual-phase iron-boride compound layers if the boriding pack becomes too potent with not enough diluent present. Levels of diluent greater than those recited can result in levels of active components that are too low to provide adequate boride layer properties.

Boronizing Compositions

The powder boronizing compositions of the present subject matter have been particularly designed to provide a boride layer of exceptionally high $Fe_2B$ level, high hardness, low porosity with good thickness levels, as well as an excellent uniformity of the boride layer. In addition, the powder compositions provide valuable processing attributes including ease of powder removal. Preferably, the powder boronizing composition contains: (a) 0.5 to 4.5 wt % of a boron source selected from $B_4C$, amorphous boron, calcium hexaboride, borax or mixtures thereof; (b) 45.5 to 88.5 wt % of a diluent selected from SiC, alumina, zirconia or mixtures thereof; (c) 1.0 to 20.0 wt % of an activator selected from $KBF_4$, ammonia chloride, cryolite sodium fluoride, ammonium bifluoride, potassium fluoride, calcium fluoride, or mixtures thereof; and (d) 10.0 to 30.0 wt % of a sintering reduction agent selected from carbon black, graphite, activated carbon, charcoal or mixtures thereof. More preferably, the powder boronizing powder composition contains (a) 2.0 to 4.0 wt % of the boron source; (b) 61.0 to 82.5 wt % of the diluent; (c) 3.5 to 10.0 wt % of the activator; and (d) 12.0 to 25.0 wt % of the sintering reduction agent. Even more preferably, the powder boronizing compositions contains: (a) 2.0 to 3.0 wt % of the boron source; (b) 69.0 to 76.0 wt % of the diluent; (c) 4.0 to 6.0 wt % of the activator; and (d) 18.0 to 22.0 wt % of the sintering reduction agent.

The powder boronizing compositions of the present disclosure provide a combination of excellent boride layer composition as well as outstanding handling characteristics. To provide this combination of properties, the powder boronizing composition preferably, has a weight ratio of sintering reduction agent/boron source, i.e., component (d)/component (a) as above, of 2.2 to 60.0. More preferably the powder boronizing composition has a ratio of component (d)/component (a) of 3.0 to 12.5. Even more preferably, the powder boronizing composition has a ratio of component (d)/component (a) of 6.0 to 11.0, and most preferably, a ratio of component (d)/component (a) of 6.3 to 8.4.

The powder boronizing composition can be prepared by dry-blending the dry components in the desired quantities. Conventional blending equipment for dry solids are used, such as barrel blending, tumble blenders such as V-blenders or double cone blenders, ribbon blenders, double arm mixers, extruder mixers, fluidizing mixers, or combinations thereof.

The individual components of the powder boronizing composition can have varying particle size distributions, e.g. a silicon carbide diluent typically has a range of about 80 to about 260µ; a boron source such as boron carbide can have a particle size of about 5 to about 90µ; the sintering reduction agents such as carbon black, and activators, such as $KBF_4$, are typically fine powders having particle sizes less than 100 microns. Generally, the particle size of the powder boronizing composition can be any such that the dry powder can readily be loaded into the pipes as described in this specification, however, it is typically desirable to minimize the level of large particles. Because the diluent is the major component, the overall powder boronizing composition will typically have an overall particle size matching the diluent selected of 80 to 260 microns.

Metals

The metals to be boronized according to the process of the current subject matter are generally any that can be boronized. Preferably, the metal article is selected from plain carbon steel, alloy steel, tool steel, stainless steel, nickel-based alloys, cobalt-based alloys, cast iron, ductile iron, molybdenum, or stellite. More preferably, the metal to be boronized are ferrous materials such as plain carbon steels, alloy steels, tool steels, and stainless steel.

Metal articles that can be boronized generally include any metal article that is susceptible to boronizing and would benefit from having improved wear and corrosion resistance. Preferably, the metal articles include components used inside of pumps and valves; turf aerating tines; components used inside agricultural harvesters such as rasp bars, cylinder bars, concave bars, and wear plates; pipes and tubing, elbows, slurry pump components, ground engaging tooling, ESP stages, chokes, coal/oil burner nozzles, glass forming and cutting tools and molds, spray nozzles, orifices, gears, rolls, and the like. More preferably, the metal article to be boronized is a metal pipe or tube.

When the metal article to be boronized is a tube or pipe, the tube or pipe preferably has an inner diameter (ID) of 1.0 to 12.0 inches. More preferably, the pipe has an ID of 1.5 to 6.0 inches. Most preferably, the pipe has an ID of 1.5 to 3.0 inches. The outside diameter of the pipe can vary depending on the pressure rating of the pipe that can require different wall thicknesses. The pressure rating of the pipe to be boronized can range from atmospheric to 2500 psig. The length of the pipe can vary. Preferably, the length of pipe can range from 1.0 to 36.0 feet. More preferably, the length of the pipe can range from 10.0 to 36.0 feet. Even more preferably, the length of the pipe can range from 31.0 to 33.0 feet. Alternatively, the length of the pipe can range from 14.0 to 18.0 feet.

In another embodiment, the subject matter of the present disclosure relates to a process comprising placing a boronizing powder composition in a metal pipe comprising a first end, a second end, an inside surface and an outside surface; and heating the pipe to a temperature from 1400° F. to 1900° F., thereby forming a borided layer on the inside surface, and generating spent reaction gases and spent boriding powder, wherein a powder displacement insert is positioned centrally inside the metal pipe so that the powder boronizing composition is located in an annular space between the outside surface of the powder displacement insert and the interior surface of the metal pipe. The powder composition includes 45.5 to 88.5 wt % of a diluent selected from SiC, alumina, zirconia or mixtures thereof; 1.0 to 20.0 wt % of an activator selected from $KBF_4$, ammonia chloride, cryolite, sodium fluoride, ammonium bifluoride, potassium fluoride, calcium fluoride, or mixtures thereof; 10.0 to 30.0 wt % of a sintering reduction agent selected from carbon black, graphite, activated carbon, charcoal or mixtures thereof; and 0.5 to 4.5 wt % of a boron source selected from $B_4C$, amorphous boron, calcium hexaboride, borax or mixtures thereof.

Boronizing Process

The boronizing process of the present subject matter is the pack cementation process, where the metal to be boronized is often surrounded by the boronizing powder in a powder container that is placed inside of a surrounding sealed vessel, typically known as a retort. Multiple powder containers may be placed inside a single retort. The boronizing powder containers are usually constructed to follow the shape and geometry of the workpieces being treated such that the amount of boriding powder needed to fill the container and surround and contact the part surfaces is minimized. One particular type of powder container is a simple open top square pan with four walls and bottom. Round open tops pots are also used for round parts. In the case of pipe/tubing, elbows, and pump housings, where only the inside surfaces of the component require boriding, the component itself may serve to be the powder container if the opens ends are capped shut to house powder inside the bore of the component, provided that the boronizing powder is in contact with the metal interior surface area of the interior of the pipe.

Figure 2:
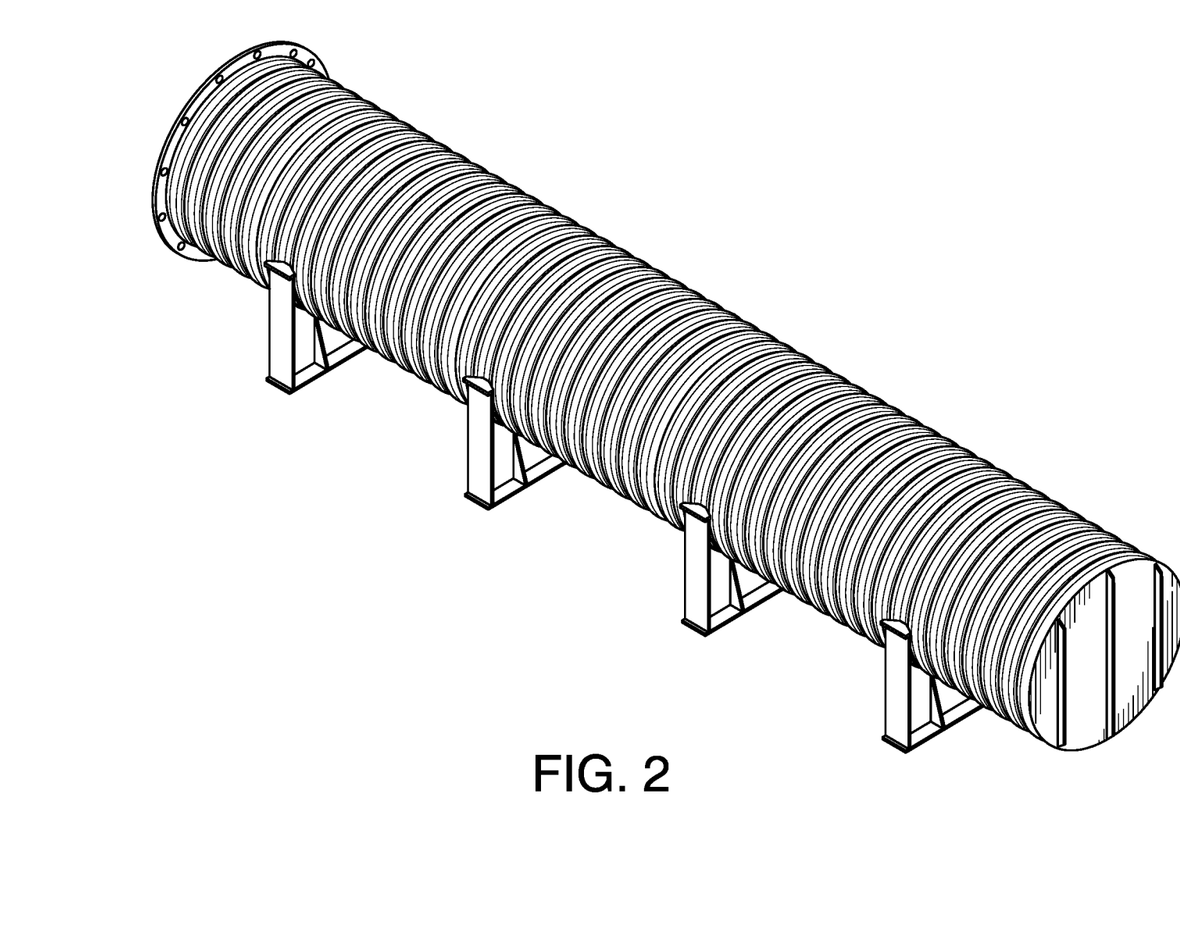
FIG. 2 illustrates a cylindrical-shaped retort.
Figure 3A:
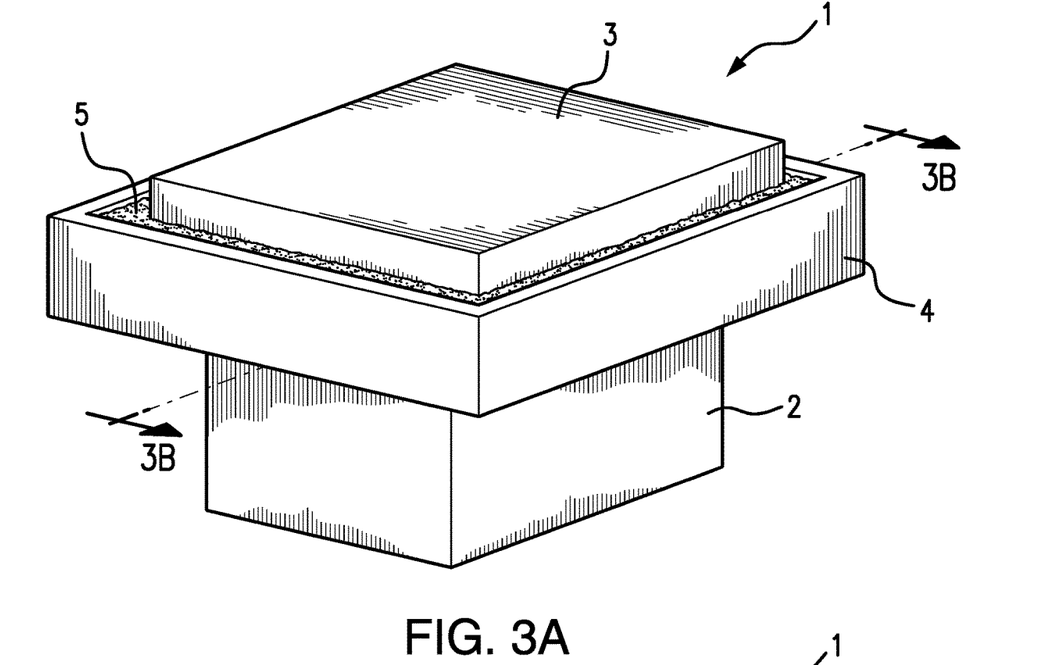
FIG. 3a illustrates top-loaded, shallow-seal retort

The retort is a sealed container designed to be filled with gases that create a positive pressure protective inert atmosphere around the powder containers to prevent air or oxygen from oxidizing the boronizing powder and the workpieces being treated. The retort may be sealed (partially or completely) by use of welding any gaps closed, using a sand seal channel, or using a bolted flange plate with a heat resistant sealing material used to fill the gap such as ceramic wool, ceramic rope, high temperature gasketing putty, or other high temperature sealing materials. The retort is often designed with a gas inlet connection such that air/oxygen may be initially purged from the retort and kept out by having the retort being maintained at a slight positive pressure produced by providing a constant flow of inert gases such as nitrogen, argon or helium to the retort. The retort is vented through a gas outlet connection where spent atmosphere and spent boriding reaction gases produced by the process may exit the retort, as they are replaced by new inert gases flowing into the retort with constant flow. Typically, the retort is constructed of high temperature resistant materials such as nickel-based superalloys, stainless, or ceramic materials to prevent it from warping or changing size during multiple exposures to high temperature cycles. Typical designs for retorts include box-like shallow seal, deep seal top-loaded, top-loaded and inverted retort designs. These are shown in FIGS. 3A/B-6A/B. For long objects, such as pipes, cylindrical-type retorts are also available, as shown in FIG. 2.

Once all boronizing powder containers are filled with parts and powder, they are then loaded into the retort and it is sealed, the retorts are placed in a furnace and heated to 1400 to 1900° F. Preferably, the retorts are heated to 1500 to 1750° F. The retorts are typically heated for 1 to 24 hours. Preferably, the retorts are heated from 4 to 16 hours. The types of furnaces typically used include either open fire or atmosphere-controlled furnaces that are generally either batch, continuous roller hearth, carbottom, or pusher-type furnaces.

Boronizing reaction gases result from the boronizing process. Depending on the type of activator that is used, these gases can include hydrofluoric acid, fluorine, hydrochloric acid, chlorine, $BF_3$, $BCl_3$, KF, NaF, or mixtures thereof. The volume of gases will also depend on the amount of activator used in the boronizing composition, where higher levels of activator correspond to higher levels of reaction gases.

If the metal part to be boronized is a pipe, the pipe is first capped on one end, and the pipe is filled with the boronizing powder. The cross section of the pipe must be completely filled with powder in the inside area of the pipe intended to be boronized, i.e., there must be physical contact between the solids and the interior (inside) of the pipe. The cap can be a metal fitting or for example, high temperature ceramic fiber cloth or metallic gauze or foils that are fastened in place across the end of the pipe to prevent the movement of boronizing powder. Once the pipe is filled, a second metal end cap or additional high temperature ceramic fiber cloth can be attached, inserted or wrapped around the other end of the pipe, again to prevent movement of the powder inside the pipe. During filling, the powder can be densified by conventional techniques such as tapping or vibrating the pipe to aid the powder settling which can help ensure the pipe will be completely filled during the high temperature processing.

Typically, the metal pipe is completely filled with a powder boronizing composition so that the powder remains in contact with the interior surface of the pipe. However, as the pipe diameter size increases, significantly higher quantities of boronizing powder are required to fill the pipe in excess of that necessary to conduct the boronizing reaction. This not only involves an unneeded high investment in powder, but subjects the plant operators to exposure to unnecessarily high levels of powder as the pipe is filled and emptied. Finally, high levels of powder also result in increased levels of reaction gases, which represents an additional environmental challenge.

To reduce these environmental and economic problems, optionally, a powder displacement insert can be used to conserve boronizing powder upon filling of the pipe, e.g., as shown in FIG. 1. The insert would be placed in the interior of the pipe to reduce the volume of powder required. The powder would then be placed in the annular space formed between the outside surface of the insert and the inside surface of the pipe to be treated. Preferably, the insert would be positioned centrally in the pipe. Generally, the insert can have any shape. Preferably, the outside surface of the insert has a hexshape. More preferably, the outside surface of the insert has a square or circular shape. Even more preferably, the insert is a metal pipe, solid rod, or cylinder having a smaller inside diameter, $d_i$ than the inner diameter $d_p$ of the pipe to be treated. The insert can be guided and centrally positioned using protruding points or rounded spacers located down the length of the insert such that only point-to-point contact between the insert and tube wall may occur even if the insert were to shift out of the centered position. The insert can also optionally be configured with raised tabs on its outside surface to maintain the radial position of the insert within the pipe. The insert may also be positioned centrally in the pipe by sealing the pipe with end caps having raised tabs. The ends of the inserts would interact with the raised tabs on the end caps to hold the pipe in place via a pressure fit.

The insert can generally be fabricated from any material suitable for the temperatures employed in the furnace. Preferably, the insert would be fabricated from materials inert to the boronizing powder or the pipe at the temperatures of the furnace, and suitable to be used repetitively. More preferably, the insert is constructed from metals inert to boronizing or ceramic material that have excellent high temperature creep properties to prevent sagging or bending of the insert during exposure for long times to the boriding temperatures.

Properties of Boronized Metals

The properties of the boride layer affected by the powder boronizing process include thickness, thickness variability, relative concentrations of $Fe_2B$ and $FeB$, hardness and porosity. The thickness of the layer can vary depending on the boronizing powder composition, the metal being boronized, the length of time for the boronizing and the temperature of the boronizing. The thickness of the boride layer is typically from 0.0005 to 0.020 inches. Preferably, the boride layer is 0.002 to 0.015 inches. More preferably, the boride layer is 0.005 to 0.015 inches. The thickness of the boride layer is calculated as the maximum distance from surface of the workpiece to the deepest tips of the boride layer observed in the cross-sectioned microstructure, where the boride layer depth is measured by examining a cross-section of a treated surface using an optical microscope.

The variability of the thickness of the boride layer is a measure of the consistency of the boronizing process. Optimally, the variability should be as low as possible, since the degree of protection the pipe enjoys from the boriding is dependent on its thickness, and portions of the pipe having a lower thickness are obviously less protected. For the purpose of this specification, the variability of the thickness of the layer is defined as the range of boride layer depth results observed in at least 5 randomly selected locations of the surfaces being examined, i.e., the distance in inches between the highest value and the lowest value. For example, if the analysis of five locations results in a layer thickness ranging from 0.008" to 0.014", the variability is the difference between the highest and lowest values, 0.006". The reported thickness of the layer is the midpoint of that range, or 0.011". Preferably, the variability of the thickness of the layer produced by the process of the present subject matter is no greater than 0.005". More preferably, the variability of the thickness of the layer is no greater than 0.003". However, in no event will the variability be greater than 50.0% of the boride layer thickness.

The formation of the boride layer can include two phases: $Fe_2B$ and $FeB$. Of these two phases, $Fe_2B$ is preferred because it is less brittle than a $FeB$ phase and exists under a state of compressive residual stress instead of tensile residual stress. Moreover, because the two phases have different coefficients of thermal expansion, mixtures of the two phases are subject to crack formation at the $Fe_2B/FeB$ interface of a dual-phase layer. The cracks can result in spalling or flaking, or even failure when subjected to mechanical stress. Thus, the percentage of $Fe_2B$ in the borided layer should be as high as possible. Preferably, the boride layer comprises 90.0 to 100.0 vol % $Fe_2B$ and 0 to 10.0 vol % $FeB$, where the fractions of $Fe_2B$ and $FeB$ are measured by comparing the depth of the $Fe_2B$ boride layer teeth to the depth of the $FeB$ boride layer teeth in the cross-sections examined. (i.e. if the $Fe_2B$ depth is 0.010" inch and the $FeB$ depth is 0.002" inch, then we would express that 20% of the boride layer is comprised of $FeB$ and 80% of the boride layer is comprised of $Fe_2B$). More preferably, the boride layer boride layer comprises 95.0 to 100.0 vol % $Fe_2B$ and 0 to 5.0 vol % $FeB$. Even more preferably, the boride layer comprises 98.0 to 100.0 vol % $Fe_2B$ and 0 to 2.0 vol % $FeB$. Most preferably, the boride layer should be a single phase $Fe_2B$ layer, where for the purpose of this specification, the term "single-phase $Fe_2B$ layer" means the layer contains no $FeB$.

Porosity is also a measure of the quality of the boride layer whereby voids or discontinuities can exist in the layer. Inspection for porosity is performed by microscopic examination of a mounted and polished cross-section of the boride layer. Preferably, the porosity of the boride layer should be less than 10%, where the porosity is measured by visual estimate or image analysis of the boride layer microstructure. More preferably, the porosity of the boride layer should be less than 5%.

Hardness of the boride layer can be measured according to the Vickers Hardness test, ASTM E384 where hardness measurements may be made directly on the treated surface or may be made on a mounted and polished cross-section of the boride layer. Preferably, the hardness of the borided layer is from 1100 to 2900 HV. More preferably, the hardness of the borided layer in ferrous materials is from 1100 to 2000 HV.

In another embodiment, the subject matter of the present disclosure relates to a process comprising placing a boronizing powder composition in a metal pipe comprising a first end, a second end, an inside surface and an outside surface; and heating the pipe to a temperature from 1400° F. to 1900° F., thereby forming a borided layer on the inside surface, and generating spent reaction gases and the spent boriding powder, wherein a powder displacement insert is positioned centrally inside the metal pipe so that the powder boronizing composition is located in an annular space between the outside surface of the powder displacement insert and the interior surface of the metal pipe.

The boronized pipes produced according to the present subject matter are especially useful in processes of the oil and gas industry where the pipes are employed in deep wells. Preferably, the boronized pipes are used in a process wherein a sucker rod pump is employed within the pipe.

Referring now to FIG. 1, shown is a view of a powder displacement insert consisting of a solid rod 1, spacer ring 2 and positioning pins 3. Typically, spacer rings would be attached at both ends of the rod to keep the rod centered in the pipe during filling with powder. Another variant of this figure would be welding the spacer rings to the bar permanently.

Referring now to FIG. 2, shown is a view of a long cylindrical retort.

Figure 3B:
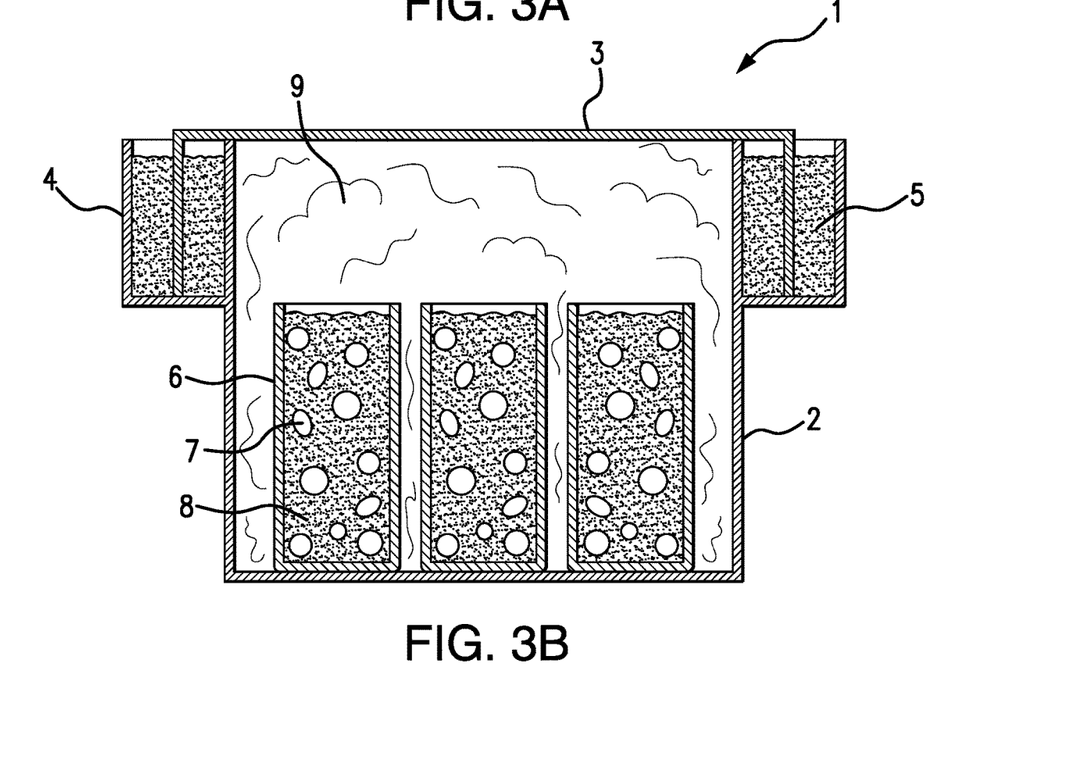

Referring now to FIG. 3a & FIG. 3b, shown in FIG. 3a is a top-loaded, shallow-seal retort 1. Retort lid 3 is fitted over base 2, with its edges resting in sealing channel 4 that is filled with sand 5 to affect the seal. FIG. 3b is a section view of the retort shown in FIG. 3a. Metal parts to be boronized 7 are placed in pots 6 inside retort 1, and pots 6 are filled with boronizing powder 8. Boronizing gases 9 produced from the boronizing powder 8 contact parts 7, fill the interior of retort 1, and coat parts 7.

Figure 4A:
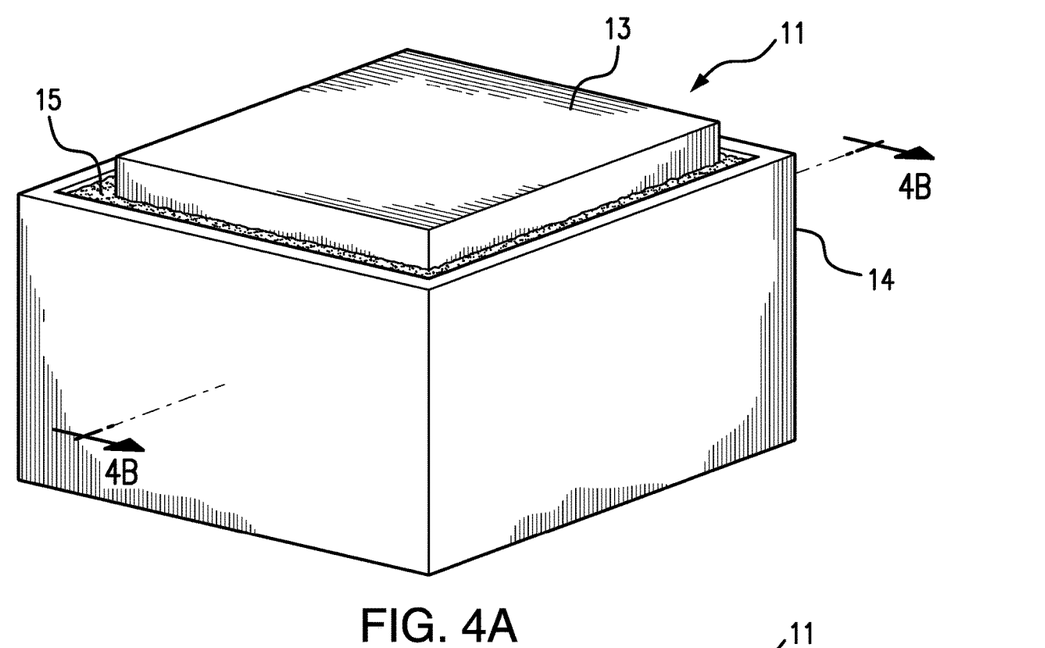
FIG. 4a illustrates a top-loaded, deep-seal retort.
Figure 4B:
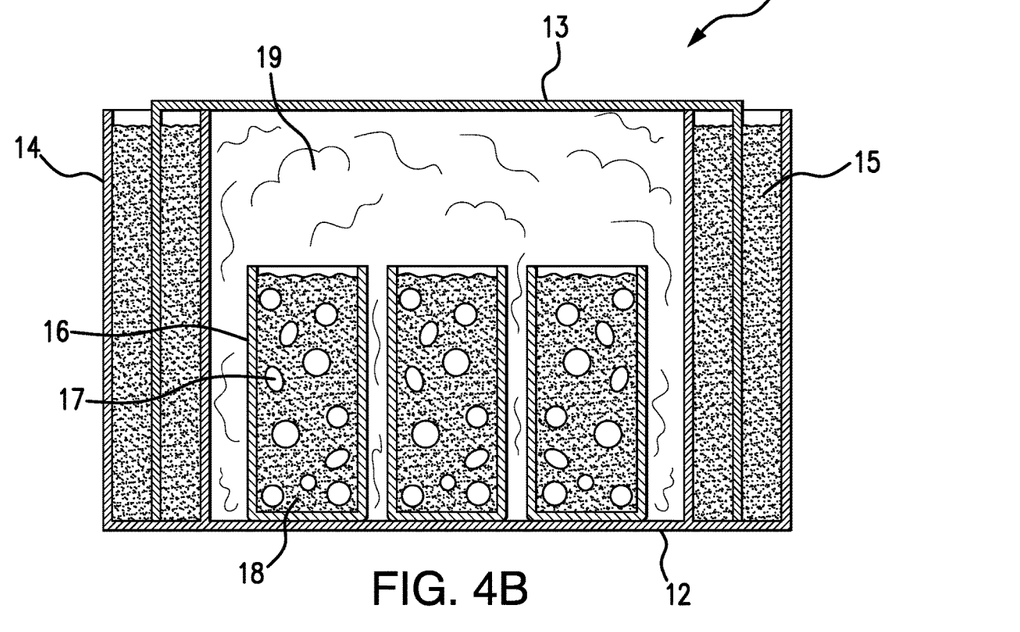
FIG. 4b illustrates a section view of the retort in FIG. 4b.

Referring now to FIGS. 4a & 4b, shown in FIG. 4a is a top-loaded, deep-seal retort 11. Retort lid 13 is fitted over the base 12 (not shown), with its edges resting in sealing channel 14 that is filled with sand 15 to affect the seal. FIG. 4b is a section view of the retort shown in FIG. 4a. Metal parts to be boronized 17 are placed in pots 16 inside retort 11, and pots 16 are filled with boronizing powder 18. Boronizing gases 19 produced from the boronizing powder 18 contact parts 17, fill the interior of retort 11, and coat parts 17.

Figure 5A:
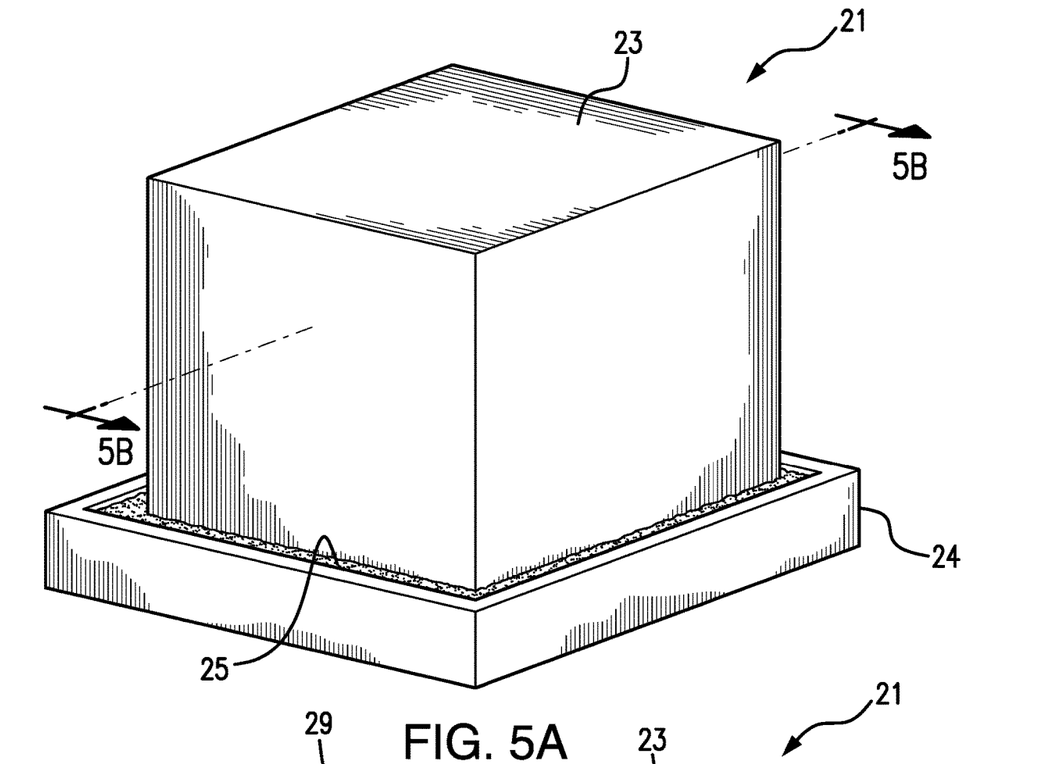
FIG. 5a illustrates an inverted, shallow-seal retort.
Figure 5B:
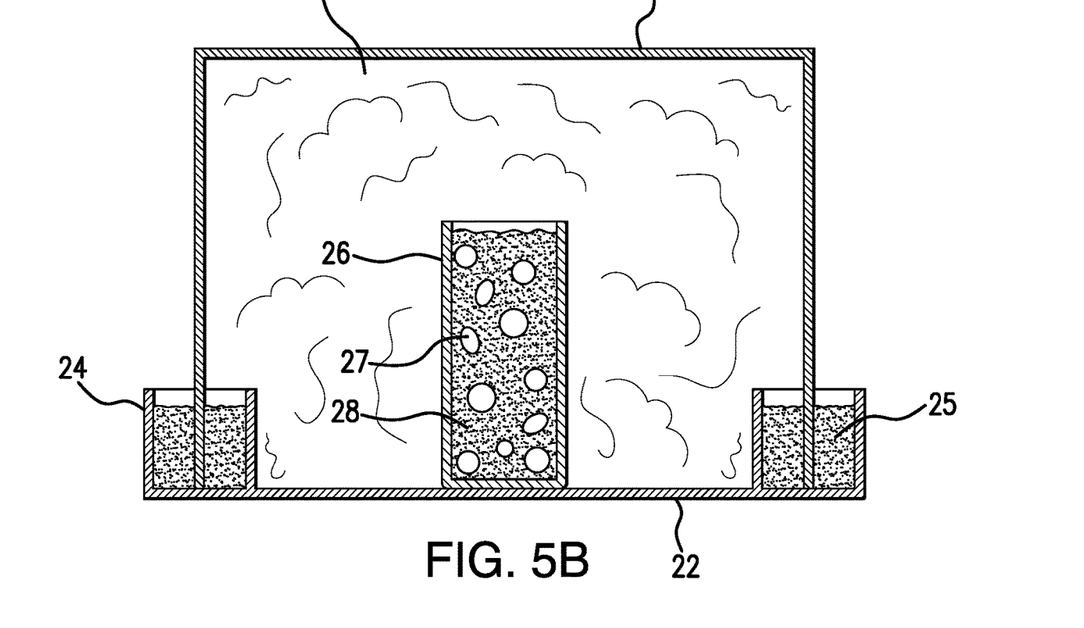

Referring now to FIGS. 5a & 5b, shown in FIG. 5a is an inverted, shallow-seal retort 21. Retort lid 23 is fitted over base 22 (not shown), with its edges resting in sealing channel 24 that is filled with sand 25 to affect the seal. FIG. 5b is a section view of the retort shown in FIG. 5a. Metal parts to be boronized 27 are placed in pots 26 inside retort 21, and pots 26 are filled with boronizing powder 28. Boronizing gases 29 produced from the boronizing powder 28 contact parts 27, fill the interior of retort 21, and coat parts 27.

Figure 6A:
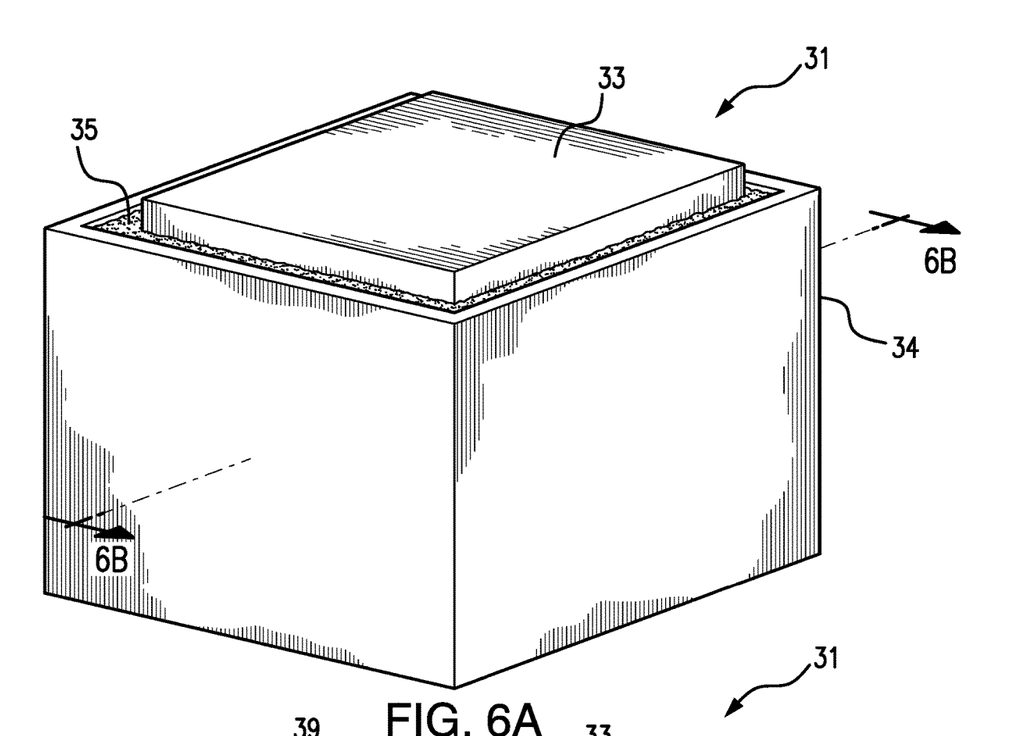
FIG. 6a illustrates an inverted, deep-seal retort.
Figure 6B:
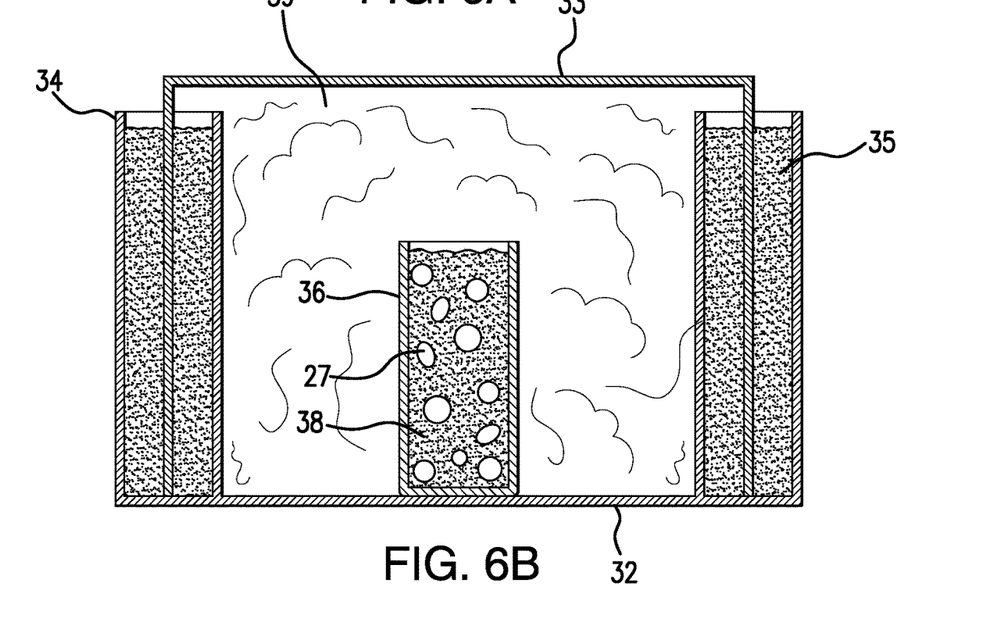

Referring now to FIGS. 6a & 6b, shown in FIG. 6a is an inverted, deep-seal retort 31. Retort lid 33 is fitted over base 32 (not shown), with its edges resting in sealing channel 34 that is filled with sand 35 to affect the seal. FIG. 6b is a section view of the retort shown in FIG. 6a. Metal parts to be boronized 37 are placed in pots 36 inside retort 31, and pots 36 are filled with boronizing powder 38. Boronizing gases 39 produced from the boronizing powder 38 contact parts 37 and fills the interior of retort 31, and coat parts 37.

The following Examples further detail and explain the preparation and performance of the powder boronizing compositions. Those skilled in the art will recognize many variations that are within the spirit of the invention and scope of the claims.

EXAMPLES

Powder boronizing compositions A-I were prepared by blending each pure constituent together in known weight percentages. These are listed in Table 1. Pipes were boronized using the compositions of A-I as described in Examples 1-8. Results of the boronizing are shown in Table 2.

TABLE 1

| | Powder Components, wt % | | | |
|---|---|---|---|---|
| Powder | $B_4C$ | $KBF_4$ | Carbon Black | SiC |
| A | 4.0 | 5.0 | 20.0 | 71.0 |
| B | 3.0 | 5.0 | 20.0 | 72.0 |
| C | 2.0 | 5.0 | 20.0 | 73.0 |
| D | 4.0 | 10.0 | 20.0 | 66.0 |
| E | 3.0 | 10.0 | 20.0 | 67.0 |
| F | 2.0 | 10.0 | 20.0 | 68.0 |
| G | 10.0 | 10.0 | 80.0 | 0.0 |
| H | 3.85 | 3.85 | 23.1 | 69.2 |
| I | 4.0 | 15.0 | 20.0 | 61.0 |

TABLE 2

Summary of Results

| Powder | Depth to tooth tips | Depth to mid-tooth | FeB to tooth tips | FeB to mid-tooth depth | Hardness (HV) | Porosity level | Average % FeB in Layer |
|---|---|---|---|---|---|---|---|
| | Boriding cycle 1750 F. for 16 hours - AISI 1026 DOM tubing | | | | | | |
| A | .011 to .013" | .007 to .009" | .002 to .004" | .001 to .002" | 1754 | None | 25.0 |
| B | .009 to .012" | .006 to .008" | Zero to .002" | Zero to .001" | 1811 | None | 9.5 |
| C | .006 to .009" | .003 to .006" | Zero | Zero | 1506 | None | 0.0 |
| D | .011 to .012" | .007 to .009" | .003" to .005" | .001" to .002" | 1700 | None | 34.8 |
| E | .010 to .012" | .007 to .009" | .002 to .004" | .001" to .002" | 1811 | None | 27.3 |
| F | .009 to .011" | .006 to .008" | Zero to .002" | Zero to .0005" | 1754 | None | 10.0 |
| I | .006" to .010" | .003" to .005" | Zero | Zero | 1811 | None | 0.0 |

TABLE 2-continued

Summary of Results

| Powder | Depth to tooth tips | Depth to mid-tooth | FeB to tooth tips | FeB to mid-tooth depth | Hardness (HV) | Porosity level | Average % FeB in Layer |
|---|---|---|---|---|---|---|---|
| Boriding Cycle - 1750 F. for 10 hours on AISI 1018 test bars | | | | | | | |
| A | .007 to .010" | not measured | Zero | Zero | 1871 | None | 0.0 |
| G | .005 to .010" | not measured | Zero | Zero | 1700 | High porosity | 0.0 |
| H | .004 to .009" | not measured | Zero | Zero | 1854 | Some porosity | 0.0 |
| Boriding Cycle - 1750 F. for 10 hours on black carbon pipe material | | | | | | | |
| A | .007 to .010" | not measured | Zero | Zero | 1854 | None | 0.0 |
| G | .004 to .009" | not measured | Zero | Zero | 1598 | Some porosity | 0.0 |
| H | .002 to .004" | not measured | Zero | Zero | 1648 | High porosity | 0.0 |

None of the samples exhibited sintering.

Example 1

A 16-foot-long 2.39" ID pipe manufactured from AISI 1026 DOM steel was used to test the boronizing of a powder composition. Powder A was placed in the pipe to fill a majority of the pipe length. The pipe was capped on one end by wrapping the end of the tube with thin Fibrefrax blanket (to fill the gap) and then sliding a metal end cap up over the Fibrefrax blanket and tack-welding the cup to the tube. Tack welding was done to hold it in place and prevent the end caps from popping off during the boriding process as the powder produces fumes and possibly builds pressure within the tubes. The Fibrefrax blanket does a good job at filling the gap and helps to prevent any powder from spilling out of the pipe as it was filled, and moved in and out of the furnace. The pipe was placed inside a retort that was filled with nitrogen. The retort was placed in a furnace and heated for 16 hours (time) at a temperature of 1750° F. The pipe was then cooled, and the powder removed and then the pipe was cross-sectioned using an abrasive cut-off saw and the cross-section was mounted, polished and etched with a 2% nital acid etchant to reveal microstructure. Boride layer depths for both FeB and Fe$_2$B were measured to the tooth tips and also to the mid-point between the tooth tips and tooth roots are all values were recorded. % FeB in the boride layer was calculated from measured depths to each layer's tooth tips and recorded. Porosity was also visually examined. Results are summarized in Table 2.

Example 2

Example 1 was repeated except that powder B was used. Results are summarized in Table 2.

Example 3

Example 1 was repeated except that powder C was used. Results are summarized in Table 2.

Example 4

Example 1 was repeated except that powder D was used. Results are summarized in Table 2.

Example 5

Example 1 was repeated except that powder E was used. Results are summarized in Table 2.

Example 7

Example 1 was repeated except that powder F was used. Results are summarized in Table 2.

Example 8

Example 1 was repeated except that powder I was used. Results are summarized in Table 2.

Example 9

A 1 foot long 1.25"ID black carbon pipe was used to test the boronizing of a powder composition. In addition to the pipe material, AISI 1018 test bars were also packed in boriding powder inside the pipe. Powder A was placed in the pipe to fill the entire pipe length. The pipe was capped on both ends with a threaded pipe cap to seal the boriding powder and test piece inside the pipe. The pipe was placed inside a furnace in air and heated for 10 hours at a temperature of 1750° F. The pipe was then cooled and the powder removed and the 1018 test piece was retrieved. Both the black carbon pipe material and the 1018 test piece were sectioned, mounted, ground, polished and etched with 2% nital acid solution to examine the boride layer depth and quality using an optical microscope. Results are summarized in Table 2.

Example 10

Example 5 was repeated except that powder G was used. Results are summarized in Table 2.

Example 11

Example 5 was repeated except that powder H was used. Results are summarized in Table 2.

Examples 12-20

A series of boriding powder compositions were prepared to evaluate sintering performance and evaluation of the boriding layer deposited. The compositions included a boron source ($B_4C$), activator ($KBF_4$), sintering reduction agent (carbon black), and diluent (silicon carbide). The level of boron source was varied, while maintaining the activator and carbon black levels constant. Pieces of precision ground AISI 1018 steel (⅛" thick×½" long) were cut from a single bar all having the same steel chemistry. Each bar was notched on the end of bar to identify it. Each of the boriding powder compositions was then placed inside a small sealed pipe constructed from a standard black iron threaded pipe nipple (¾" pipe size×4" long) with two ¾" cast iron threaded pipe caps screwed onto both ends. The steel test bars were suspended in the center of the sealed pipes completely submerged in the boriding powder composition. All the sealed capped pipes holding the test bars suspended in powder inside the capped pipes were placed inside a large container and loaded into a furnace. The furnace was ramped up to heat at 500° F. per hour to 1750° F. and held at 1750° F. for 12 hours at heat followed by slow cooling. The atmosphere in the furnace was air. At the end of the boriding, each pipe was opened and its contents removed. The powder was examined for evidence of sintering, and each test bar was sectioned, mounted, ground and polished. The cross-sections were then etched with a 2% nital acid solution to reveal the boride layer microstructure present in the cross-section. The boride layer microstructures were photographed and the boride layer analyzed. The boriding compositions and results are shown in Table 3.

iron-boride layer precipitating out right at the surface of the part. The term "shallow or shallower" boride layer means that the layer is not as deep, and refers to how deep below the surface of the bonded part where an iron-boride compound is present. The term "highly porous and incomplete layer" means layers with empty pores (voids) present in the boride layer that have poor mechanical properties. The voids and pores beneath the metal surface are bubbles of gas or vacuum that form when there is not enough $KBF_4$ present. The term "single-phase $Fe_2B$ solid layer," means a complete layer having a single phase of $Fe_2B$ with no FeB or ferrite present.

The results of Table 3 indicate that none of the Examples exhibited sintering. Samples 12-14, corresponding to boron source concentrations 0.3 to 1.0 wt % exhibit incomplete boride layers at the surface. Samples 15-19, corresponding to boron source concentrations of 2.0 to 4.5 wt % exhibit a solid, single-phase layer of $Fe_2B$. Sample 20, corresponding to a boron source concentration of 5.0 wt %, produces a boride layer having a mostly single-phase $Fe_2B$ solid layer, with some FeB at the surface.

Examples 21-28

A series of bonding powder compositions were prepared and tested as with Examples 12-20 above. The bonding compositions and results are shown in Table 4, where the activator $KBF_4$ is varied between 0.5 to 25.0 wt %, while the boron source and carbon black concentrations are held constant.

TABLE 3

| | Example | | | | | | | | |
|---|---|---|---|---|---|---|---|---|---|
| | 12 | 13 | 14 | 15 | 16 | 17 | 18 | 19 | 20 |
| $B_4C$, wt % | 0.3 | 0.5 | 1.0 | 2.0 | 2.5 | 3.0 | 4.0 | 4.5 | 5.0 |
| $KBF_4$, wt % | 5.0 | 5.0 | 5.0 | 5.0 | 5.0 | 5.0 | 5.0 | 5.0 | 5.0 |
| Carbon Black, wt % | 20.0 | 20.0 | 20.0 | 20.0 | 20.0 | 20.0 | 20.0 | 20.0 | 20.0 |
| Silicon Carbide, wt % | 74.7 | 74.5 | 74.0 | 73.0 | 72.5 | 72.0 | 71.0 | 70.5 | 70.0 |
| Sintering | no | no | no | no | No | no | no | no | no |
| Boride Layer Thickness, inch | 0.004 | 0.004 | 0.005 | 0.0075 | 0.008 | 0.008 | 0.010 | 0.009 | 0.010 |
| Boride Layer Quality* | (1) | (1) | (1) | (2) | (2) | (2) | (2) | (2) | (3) |

*(1) incomplete layer at surface (2) single-phase $Fe_2B$ solid layer (3) mostly single-phase $Fe_2B$ solid layer, some FeB at surface (4) highly porous and incomplete layer For the purposes of this specification, the term "incomplete layer at surface" means the presence of iron-boride compound, but not a continuous layer. This surface structure is ferrite which is a steel structure where there is not any

TABLE 4

| | Example | | | | | | | |
|---|---|---|---|---|---|---|---|---|
| | 21 | 22 | 23 | 24 | 25 | 26 | 27 | 28 |
| $B_4C$, wt % | 2.5 | 2.5 | 2.5 | 2.5 | 2.5 | 2.5 | 2.5 | 2.5 |
| $KBF_4$, wt % | 0.5 | 1.0 | 3.5 | 4.0 | 6.0 | 10.0 | 20.0 | 25.0 |
| Carbon Black, wt % | 20.0 | 20.0 | 20.0 | 20.0 | 20.0 | 20.0 | 20.0 | 20.0 |
| Silicon Carbide, wt % | 77.0 | 76.5 | 74.0 | 73.5 | 71.5 | 67.5 | 57.5 | 52.5 |
| Sintering | yes | yes | no | no | no | no | no | yes |
| Boride Layer Thickness, inch | 0.004 | 0.006 | 0.008 | 0.008 | 0.010 | 0.010 | 0.010 | 0.010 |

TABLE 4-continued

| | Example | | | | | | | |
|---|---|---|---|---|---|---|---|---|
| | 21 | 22 | 23 | 24 | 25 | 26 | 27 | 28 |
| Boride Layer Quality* | (4) | (4) | (2) | (2) | (2) | (2) | (2) | (2) |

*(1) incomplete layer at surface (2) single-phase Fe$_2$B solid layer (3) mostly single-phase Fe$_2$B solid layer, some FeB at surface (4) highly porous and incomplete layer The results of Table 4 indicate that samples having the lowest levels of activator (Examples 21 and 22 with activator levels of 0.5 and 1.0 wt %, respectively), and at the highest level of activator (Example 28, activator level of 25.0 wt %) exhibit sintering. Examples 21 and 22 also exhibit highly porous and incomplete boride layers, with the rest of the samples having single-phase Fe$_2$B solid layers.

Examples 29-36

A series of boriding powder compositions were prepared and tested as with Examples 12-20 above. The boriding compositions and results are shown in Table 5, where the sintering reduction agent (carbon black) is varied between 5.0 to 35.0 wt %, while the boron source and activator concentrations are held constant.

TABLE 5

| | Example | | | | | | | |
|---|---|---|---|---|---|---|---|---|
| | 29 | 30 | 31 | 32 | 33 | 34 | 35 | 36 |
| B$_4$C, wt % | 2.5 | 2.5 | 2.5 | 2.5 | 2.5 | 2.5 | 2.5 | 2.5 |
| KBF$_4$, wt % | 5.0 | 5.0 | 5.0 | 5.0 | 5.0 | 5.0 | 5.0 | 5.0 |
| Carbon Black, wt % | 5.0 | 10.0 | 12.0 | 18.0 | 22.0 | 25.0 | 30.0 | 35.0 |
| Silicon Carbide, wt % | 87.5 | 82.5 | 80.5 | 74.5 | 70.5 | 67.5 | 62.5 | 57.5 |
| Sintering | yes | no | no | no | no | no | no | no |
| Boride Layer Thickness, inch | 0.010 | 0.010 | 0.010 | 0.009 | 0.010 | 0.006 | 0.006 | 0.005 |
| Boride Layer Quality* | (2) | (2) | (2) | (2) | (2) | (2) | (2) | (2) |

*(1) incomplete at surface (2) single-phase Fe$_2$B solid layer (3) mostly single-phase Fe$_2$B solid layer, some FeB at surface (4) highly porous and incomplete layer The results of Table 5 indicate that Example 29, containing the lowest level of sintering reduction agent (5.0 wt %) results in sintering. All of the samples provided boride layers having single-phase, Fe$_2$B layers. However, Examples 34-36, corresponding to levels of anti-sintering agent of 25.0 to 35.0 wt % result in lower boride layer thickness. Without wishing to be bound by theory, Applicants believe that one possible explanation is that the lower thermal conductivity (higher carbon black content) powders took a longer time to reach the 1750° F. boriding temperature during the test, and started boriding later than the lower carbon black concentration examples. Another possible explanation is that the low density of the carbon black causes a fixed mass of carbon to take up significantly more volume than silicon carbide, and that this resulted in diluting the boron carbide and KBF$_4$ concentrations.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A powder boronizing composition comprising:
   a. 0.5 to 4.5 wt % of a boron source selected from B$_4$C, amorphous boron, calcium hexaboride, Na$_2$B$_4$O$_7$·10H$_2$O or mixtures thereof;
   b. 45.5 to 88.5 wt % of a diluent selected from SiC, alumina, zirconia or mixtures thereof;
   c. 1.0 to 20.0 wt % of an activator selected from KBF$_4$, ammonia chloride, cryolite, sodium fluoride, ammonium bifluoride, potassium fluoride, or mixtures thereof; and
   d. 10.0 to 30.0 wt % of a sintering reduction agent selected from carbon black, graphite, activated carbon, charcoal or mixtures thereof, wherein the powder boronizing composition produces a boride layer of 0.008 to 0.020 in, and the ratio of component (d)/component (a) is 2.2 to 60.0.

2. The powder boronizing composition of claim 1 comprising:
   a. 2.0 to 4.0 wt % of the boron source;
   b. 61.0 to 82.5 wt % of the diluent;
   c. 3.5 to 10.0 wt % of the activator; and
   d. 12.0 to 25.0 wt % of the sintering reduction agent.

3. The powder boronizing composition of claim 2 comprising:
   a. 2.0 to 3.0 wt % of the boron source;
   b. 69.0 to 76.0 wt % of the diluent;
   c. 4.0 to 6.0 wt % of the activator; and
   d. 18.0 to 22.0 wt % of the sintering reduction agent.

4. The powder composition of claim 1 wherein the boron source is B$_4$C.

5. The powder composition of claim 1 wherein the activator is KBF$_4$.

6. The powder composition of claim 1 wherein the sintering reduction agent is carbon black.

7. The powder composition of claim 1 wherein the diluent is SiC.

8. The powder composition of claim 1 wherein the boron source is $B_4C$, the activator is $KBF_4$, the sintering reduction agent is carbon black, and the diluent is SiC.

9. The boronizing powder composition of claim 1 wherein the ratio of component (d)/component (a) is 3.0 to 12.5.

10. The boronizing powder composition of claim 9 wherein the ratio of component (d)/component (a) is 6.0 to 11.0.

11. The powder boronizing composition of claim 1 wherein the boride layer produced by the boronizing composition is 0.010 to 0.020 in.

12. The powder boronizing composition of claim 11 wherein the boride layer produced by the boronizing composition is 0.012 to 0.020 in.

13. The boronizing composition of claim 12 wherein the boride layer produced by the boronizing composition is 0.015 to 0.020 in.

* * * * *